Patented Nov. 27, 1951

2,576,104

UNITED STATES PATENT OFFICE 2,576,104

DEHYDRATION AND ISOMERIZATION OF STRAIGHT-CHAIN-CONJUGATED POLYENE ESTERS AND ACIDS

Edgar M. Shantz, Charles D. Robeson, and Henry M. Kascher, Rochester, N. Y., assignors, by mesne assignments, to Eastman Kodak Company, Rochester, N. Y., a corporation of New Jersey No Drawing. Application September 9, 1947, Serial No. 773,086. In Great Britain December 24, 1946

19 Claims. (Cl. 260—617)

This invention relates to improved methods for the preparation of esters of β-ionylidene acetic acid and the isoprenologs thereof i. e. vitamin A acid esters. The invention further relates to methods for preparing vitamin A in improved yield.

Synthesis of vitamin A has been attempted by first subjecting β-ionone to a Reformatsky reaction with a haloacetate, such as ethyl bromoacetate, to give a hydroxy ester. This reaction, and those subsequent, may be illustrated in connection with general formulas; wherein, in the present instance, X represents bromine, R' represents the ethyl group, $C_2H_5$, and the catalyst employed is zinc. Further representations of symbols X, R' and catalyst are described hereinafter.

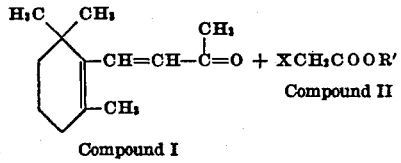

Compound I
β-ionone

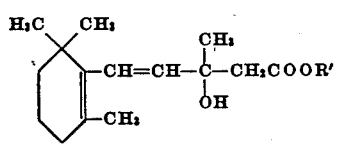

Compound III
Ester of β-ionolacetic acid

The hydroxy ester, identified above as Compound III, was then dehydrated by distillation under moderate vacuum (e. g. 3 mm. mercury pressure) or by refluxing with an acid for a short time to produce a mixture of compounds consisting only in part of the desired Compound IV of the following formula:

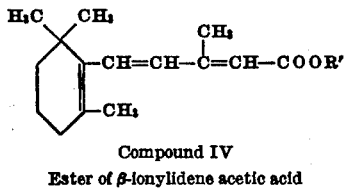

Compound IV
Ester of β-ionylidene acetic acid

Poor yields of the order of 5–25% of this desired Compound IV, which is an intermediate in a proposed vitamin A synthesis, were isolated from this mixture and these small yields adversely affected both the promotion of the synthesis as well as its economies.

The preparation of a compound alleged to be Compound IV was reported by Karrer, Salomon, Morf, and Walker using a similar procedure. (Helv. Chim. Acta, 1932, 15, 878) and Sobotka, Darby, Glick, and Bloch (J. Amer. Chem. Soc. 1945, 67, 403). Heilbron, Jones, and O'Sullivan (J. Chem. Soc. (London) October 1946, 866) reported, however, that the Reformatsky reaction of β-ionone and ethyl bromoacetate, followed by dehydration, was by no means straight forward and that their own investigations provided additional evidence of its complexity. No clearcut explanation of the cause of the low yield of Compound IV was, however, made.

There is accordingly a need in the art for an improved and certain method of changing the hydroxy ester of Compound III, as indicated by the general formulas, to the intermediate compound, namely Compound IV, which is required for the vitamin A acid ester synthesis.

This invention, therefore, has for one object to provide an improved method for producing esters of β-ionylidene acetic acid. Another object is to provide a method for producing vitamin A acid esters in improved yield. Still another object is to provide a method for producing straight chain-conjugated polyene esters, and acids in improved yield. Another object is to synthesize vitamin A in improved yield. Other objects will appear hereinafter.

We have discovered that dehydration of the hydroxy ester (Compound III), by the procedures of the prior art described above, produces at least two compounds. We have found that Compound IV is thus formed in relatively small amounts while a major product of the reaction appears from our analysis to be an isomer of Compound IV which may have the following structure:

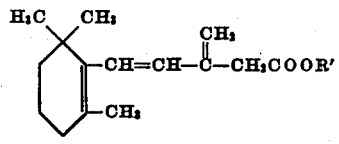

Compound V

Compound V gives a structure for the isomer of Compound IV which is consistent with our investigation. Nevertheless, the structure assigned may not be wholly correct. Our invention applies to any compounds derived from Compound III during the dehydration process which are capable of being transformed according to the present method to give the desired product (Compound IV) irrespective of their molecular structure. For convenience we shall refer to Compound V as an isomer of Compound IV and as being the principal compound present capable of undergoing the change herein described, but it is understood that our invention does not require that Compound V have the structure assigned above or that it be the only compound present capable of undergoing the reaction hereinafter described.

In accordance with one aspect of our invention we have found that Compound V can be converted in good yield to the desired Compound IV, which is the intermediate compound required in the particular vitamin A synthesis herein described, by a new process which includes contacting Compound V with a catalyst having the property of labilizing conjugated double bonds and particularly one which attracts ionizing protons under conditions which will promote the isomerization of Compound V to Compound IV. This will increase the content of $\alpha,\beta$ unsaturated ester. Preferably this reaction is conducted at reflux temperatures while Compound V is dissolved in a solvent, the catalyst being added thereto. The temperature, reaction time, and catalyst must be suitably adjusted for maximum operating efficiency. If a weak catalyst is used, the reaction time must be lengthened and/or the temperature increased for efficient operation. If a strong catalyst, such as oxalyl chloride is used, the reaction may be carried out at room temperature in several hours. Increasing the temperature shortens the time of reaction but too high a temperature promotes decomposition of the reactants. The reaction may be suitably adjusted within a wide range of temperature, and reaction time, e. g., room temperature to reflux temperature, and from about 5 minutes to about one day or more reaction time. The reaction proceeds until an equilibrium is established between the isomers, Compounds IV and V. The two isomers may be separated by appropriate means e. g. by adsorption, distillation, or solvent extraction. By repetition of the isomerization and separation steps, a yield of as high as 70–80% of Compound IV may be obtained from Compound V or other isomers present. Thus our novel process permits the production of an important intermediate in vitamin A synthesis in improved yields.

In accordance with another and very convenient feature of our invention, the dehydration and isomerization steps may be conducted more or less simultaneously. In this process the preferred type of catalyst is introduced into a solution containing Compound III, or a mixture of Compounds III and V. On heating in the presence of the preferred type of catalyst, the catalyst first acts to dehydrate Compound III to produce Compound V and then isomerizes Compound V to give Compound IV. Our investigations indicate that some Compound IV may be directly formed from Compound III during the dehydration reaction. The separation of Compound IV from the reaction, alternating with repeated isomerization of Compound V remaining in the reaction mixture, will give a high yield of the desired Compound IV.

In the foregoing reactions the preferred Reformatsky reaction catalyst is zinc although magnesium may be employed instead.

In the following general formulas in addition to bromine, X represents other halogens such as iodine and chlorine. Fluorine appears to be less suitable for use in the invention. R' in the general formulas represents a hydrocarbon radical such as methyl, ethyl, phenyl, benzyl, octyl, palmityl, stearyl, allyl, etc. It will be understood that R' usually represents the same and only one radical at a time in the series of reactions; however, the reactions will proceed in a similar manner on a mixture of compounds in which R' respectively represents different members of the group. Accordingly, as in the specific reactions described above R' represents the ethyl group throughout the explanation. However, the broader conception of the invention is also apparent from these general formulas.

The type of solvents in which the Compounds III, IV and V may be dissolved during the dehydration and isomerizing reactions apparently is subject to wide variation so long as they have substantial solvent power for the reactants. Among the preferred solvents are aromatic solvents such as benzene, toluene and xylene. Acetone and carbon tetrachloride are also suitable. Liquids which are sufficiently inert that they will not enter into the reaction may be used as solvents with satisfactory results. Petroleum ether is a mixture of many low-boiling hydrocarbons but is a satisfactory solvent since all the hydrocarbons present are too inert to react with the material undergoing dehydration.

The interconversion of Compounds IV and V may take place upon the shifting of a hydrogen atom. Where such an interconversion can take place, the system is known as a prototropic system.

The catalyst is believed to act by promoting the ionization of protons. Promoting the mobility of the hydrogen atoms thereby speeds the reaction to equilibrium conditions. The preferred catalyst is apparently one which has the strongest attraction for the ionizing protons without having at the same time a destructive effect upon the prototropic compounds. In accordance with our invention we have found that iodine, phosphorus oxychloride, oxalyl chloride, phosphorus trichloride, dimethylaniline hydroiodide, para-toluene sulfonic acid, and phosphoric acid, will promote satisfactory isomerization. Sulfuric acid may be employed but it tends to decompose the compounds somewhat and is, therefore, not as satisfactory as the other catalysts. Sodium ethylate in anhydrous ethanol is suitable for isomerizing the isomeric ester (V) but causes destruction of Compound III.

The quantity of the catalyst used may vary over a wide range. We have achieved satisfactory results while using as little as 3 mg. of iodine per gram of ester. Only slightly better yields were obtained when using 80 mg. of phosphorus oxychloride per gram of ester.

In accordance with still another feature of the invention, the isoprenolog of Compound I may be prepared from Compound IV in the following manner. Compound IV is treated with a hydride such as aluminum hydride or lithium aluminum hydride to reduce the ester group to an alcohol group which in turn is oxidized to a ketone by treatment with an aluminum or magnesium alkoxide, such as aluminum isopropoxide, in the presence of acetone, to form the isoprenolog of Compound I which is illustrated in the following formula:

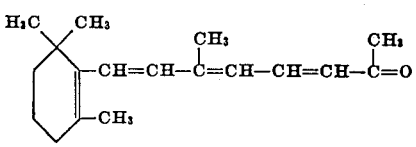

Compound VI

We have found that this isoprenolog (Compound VI) of Compound I likewise can be changed by similar reactions to a compound similar to natural vitamin A and which possesses full vitamin A activity.

Compound VI may thus be subjected to a Reformatsky reaction, in a manner similar to that described in connection with the reactions involving Compound I, to give Compound VII, the hydroxy ester isoprenolog of Compound III.

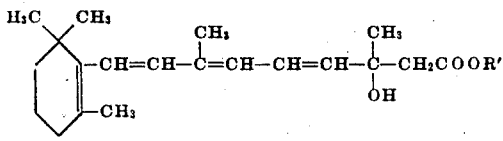

Compound VII
Ester of α-hydro-β-hydroxy vitamin A acid

As in the case of Compound III, its isoprenolog, the hydroxy Compound VII, on dehydration by substantially similar procedure gives predominately an isomeric Compound IX. This may be catalytically isomerized by similar methods to yield a mixture, containing the following Compound VIII and the isomer, possibly Compound IX, which are respectively isoprenologs of Compounds IV and V.

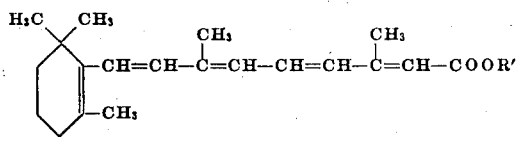

Compound VIII
Ester of vitamin A acid

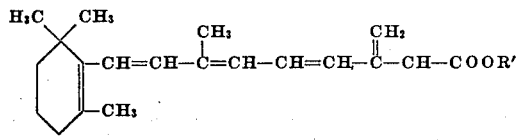

Compound IX

Compound IX is analogous to Compound V and there is a similar question as to its molecular structure. The structure given is consistent with our investigation but it may not be entirely correct. In any event, it appears to be an isomer of Compound VIII which may be converted to Compound VIII in accordance with our invention. The structure shown for Compound IX is given for the sake of convenience but it is understood that our invention applies to any compound derived from Compound VII during the dehydration process which is capable of being transformed according to the invention to give Compound VIII. This compound or compounds may or may not have the structure of Compound IX.

such as oxalyl chloride or phosphorous oxychloride and carry out the reaction at room or lower temperature. We prefer to allow the reaction to take place over a period of about 4 hours but if heat is applied the time may be shortened to as little as 15 minutes. The desired isomer, Compound VIII, may be separated from Compound IX and the isomerization continued on Compound IX until, after alternate isomerization and separation steps, a high yield of the desired Compound VIII is obtained.

Compounds VIII and IX like Compounds IV and V may be separated from each other by distillation, solvent extraction or adsorption. The ease of decomposition of the molecule necessitates distillation under reduced pressure. A still of 5 plate efficiency is effective in making a 70% separation of Compound IV from Compound V from an initial 50-50 mixture. The separation of Compound VIII from Compound IX is less sharp but Compound VIII may be concentrated by distillation.

Separation, by solvent extraction, of the unsaturated esters (Compounds V and IX) from the α,β unsaturated esters (Compounds IV and VIII) depends on the fact that the former esters are more soluble in certain polar solvents such as aqueous methanol and dimethyl sulfolane than are the corresponding α,β esters. A preparation of mixed isomers (Compounds IV and V) in the ratio of 1:1 dissolved in petroleum ether was shaken with four fresh portions of dimethyl sulfolane. The residue, after evaporation of petroleum ether, contained Compounds IV and V in the ratio of 65:35. Similarly, after 5 extractions of the mixed isomers with 90% aqueous methanol, the residual concentrate contained the isomers (Compounds IV and V) in the ratio of 3:2.

Chromatographic adsorption may be effectively employed to separate the isomeric esters. The adsorption column may be packed with a mild adsorbent, for instance, sodium aluminum silicate in finely divided form. A solution containing Compounds IV and V or Compounds VIII and IX is dissolved in a solvent, for example, petroleum ether, and added to the adsorption column. The Compound V and Compound IX esters are more strongly adsorbed permitting the α,β esters to flow through the column. Residual α,β esters may be washed from the column with petroleum ether. After the adsorption column is free from the α,β ester, the Compound V and Compound IX esters may be eluted from the adsorbent by a solvent, for example, benzene and again subjected to the isomerizing reaction.

Table 1 illustrates the relative effectiveness of a number of catalysts employed in producing the equilibrium mixture from Compound III.

TABLE 1

| No. | Catalyst | Reaction Conditions | | | | (V) $E_{1\,cm.}^{1\%}$ 284 mμ | (IV) $E_{1\,cm.}^{1\%}$ 304 mμ | $\dfrac{E\,284}{E\,304}$ |
|---|---|---|---|---|---|---|---|---|
| | | g. Cpd. III | cc. solvent[1] | wt. catalyst, mg. | time, hr. | | | |
| 1 | POCl₃ | 1 | 10 | 80 | 1 | 686 | 470 | 1.46 |
| 2 | Iodine | 1 | 10 | 3 | 4 | 649 | 431 | 1.51 |
| 3 | p-toluene sulfonic acid | 1 | 10 | 50 | 1 | 618 | 428 | 1.44 |
| 4 | zinc chloride in acetic acid | 1 | 10 | 100 | 1 | 662 | 376 | 1.76 |
| 5 | formic acid | 1 | 10 | 100 | 1 | 878 | 374 | 2.35 |

[1] Benzene, except in No. 4.

We have found that the long chain isoprenolog compounds are more easily decomposed and it is, therefore, preferred to employ as catalysts for the isomerization reaction the more active catalysts The amount of the desired Compound IV which is present at equilibrium can be determined from the ultraviolet absorption curve of the reaction mixture and the absorption curves of the pure isomeric compounds. Compound V, for example, has a strong absorption band at 284 mµ and Compound IV has a similar band at 304 mµ. Thus, the ratio of extinction coefficients $$\frac{(E_{1\ cm.}^{1\%}\ 284\ m\mu)}{(E_{1\ cm.}^{1\%}\ 304\ m\mu)}$$

provides a measurement of the amount of Compound IV present. The lower the ratio becomes the higher the percentage of Compound IV is present. A ratio in excess of 2 represents a low concentration of $\alpha,\beta$ unsaturated compound, while a ratio less than 1.7 represents a high concentration of $\alpha,\beta$ compound. This ratio is shown in the right-hand column of Table 1.

While it is possible to produce equilibrium without the use of a solvent, it will usually be found preferable to employ one. Aromatic hydrocarbons such as benzene, toluene, and xylene, aliphatic hydrocarbons such as petroleum ether, and halogenated solvents, such as carbon tetrachloride, are preferred (Table 2). Ethers such as isopropyl ether are less suitable because isomerization occurs at a markedly slower rate.

TABLE 2

| No. | Catalyst | Reaction Conditions | | | | (V) $E_{1\ cm.}^{1\%}$ 284 m$\mu$ | (IV) $E_{1\ cm.}^{1\%}$ 304 m$\mu$ | $\frac{E284}{E304}$ |
|---|---|---|---|---|---|---|---|---|
| | | g. Cpd. III | cc. solvent | wt. catalyst, mg. | time, hr. | | | |
| 1 | Iodine | 1 | toluene, 10 cc | 3 | 0.5 | 652 | 441 | 1.55 |
| 2 | POCl₃ | 1 | ...do... | 80 | 0.2 | 719 | 444 | 1.6 |
| 3 | ...do... | 1 | benzene, 10 cc | 80 | 1 | 743 | 428 | 1.74 |
| 4 | ...do... | 1 | isopropyl ether, 10 cc | 80 | 1 | 963 | 466 | 2.07 |
| 5 | ...do... | 1 | carbon tetrachloride, 10 cc | 80 | 1 | 764 | 458 | 1.67 |
| 6 | ...do... | 1 | petroleum ether, Skellysolve B, 10 cc | 80 | 1 | 648 | 458 | 1.42 |

The concentration of reactants used depends principally on the catalyst and on the time of heating. Table 3 shows that too dilute a solution of the catalyst delays attainment of equilibrium.

TABLE 3

| No. | Catalyst | g. Cpd. III | cc. benzene | wt. catalyst, mg. | time, hr. | (V) $E_{1\ cm.}^{1\%}$ 284 m$\mu$ | (IV) $E_{1\ cm.}^{1\%}$ 304 m$\mu$ | $\frac{E284}{E304}$ |
|---|---|---|---|---|---|---|---|---|
| 1 | POCl₃ | 1 | 10 | 80 | 1 | 743 | 428 | 1.74 |
| 2 | POCl₃ | 1 | 40 | 80 | 1 | 1,005 | 453 | 2.22 |

The examples cited are of ethyl esters but other esters may be used. Table 4 shows the effect of allyl and phenyl esters compared with ethyl esters.

TABLE 4

| No. | Ester | Catalyst | Reaction Conditions | | | | (V) $E_{1\ cm.}^{1\%}$ 284 m$\mu$ | (IV) $E_{1\ cm.}^{1\%}$ 304 m$\mu$ | $\frac{E284}{E304}$ |
|---|---|---|---|---|---|---|---|---|---|
| | | | g. Cpd. III | cc. benzene | wt. catalyst, mg. | time, hr. | | | |
| 1 | allyl | iodine | 1 | 40 | 3 | 4 | 641 | 487 | 1.32 |
| 2 | phenyl | ...do... | 1 | 40 | 3 | 4 | 569 | 365 | 1.55 |
| 3 | ethyl | ...do... | 1 | 40 | 3 | 4 | 563 | 342 | 1.64 |

The value of the ratio for the allyl ester (1.32) corresponds to a percentage of approximately 55% of the $\alpha,\beta$ compound in the equilibrium mixture, whereas the value of 1.64 corresponds to a value of about 31% $\alpha,\beta$ compound in the equilibrium mixture.

TABLE 5

| No. | Ester | Solvent | Time | Temp. | Catalyst | g. Catalyst per g. ester | cc. Solvent per g. ester | Per cent $\alpha,\beta$ Ester in Isomerization Mixture (infrared analysis) | (IV) $E_{1\ cm.}^{1\%}$ 304 m$\mu$ | (V) $E_{1\ cm.}^{1\%}$ 284 m$\mu$ | $\frac{E284}{E304}$ |
|---|---|---|---|---|---|---|---|---|---|---|---|
| 1 | V | benzene | 1 hr | 78 | POCl₃ | 0.06 | 10 | 0 | 381 | 1,015 | 2.67 |
| 2 | V | ...do... | 6 hrs | 78 | POCl₃ | 0.06 | 10 | 45 | 389 | 566 | 1.45 |
| 3 | V | carbon tetrachloride | 6 hrs | 79 | POCl₃ | 0.06 | 10 | 45 | 430 | 670 | 1.56 |
| 4 | V+III | benzene | 1 hr | 78 | POCl₃ | 0.06 | 10 | 45 | 451 | 737 | 1.64 |
| 5 | V | ...do... | 1 hr | 78 | H₃PO₄ POCl₃ | 0.09 0.10 | 30 | 45 | 422 | 667 | 1.58 |
| 6 | V | acetone (95%) | ½ hr | 55 | H₂SO₄ | 0.60 | 10 | 45 | 408 | 768 | 1.88 |
| 7 | V | benzene aceticacid | 10 min | 40 | H₂SO₄ | 0.37 | 12.5 | 45 | 422 | 642 | 1.52 |

Table 5 indicates that attainment of equilibrium by the use of phosphorous oxychloride and benzene requires more than one hour of refluxing according to the procedure which is effective on hydroxy esters (Compound III). On this table the percentage of Compound IV present in the isomerization mixture is indicated by infra red spectrum measurements as well as by ultra violet absorption measurements. As with the ultra violet method purified preparations of $\alpha,\beta$ and isomeric ester are used to standardize the analytical procedure.

Experiments 2 and 3 in Table 5 show that refluxing the isomeric ester for six hours with phosphorous oxychloride in benzene and carbon tetrachloride is sufficient to effect an isomerization to the equilibrium point (approximately 50% α,β esters). Carbon tetra-chloride appeared to be slightly superior to benzene as a solvent because less destruction of esters occurred. Experiment 4 indicates that the addition of 20% of hydroxy ester (Compound III) to isomeric ester was sufficient to cause isomerization to occur with phosphorous oxychloride and benzene in one hour. Experiments 5, 6, and 7 show the effectiveness of various mineral acid catalysts in effecting isomerization of isomeric ester.

The above tables illustrate the application of our invention to Compounds III, IV, and V. The following examples illustrate the application of our invention to Compounds VII, VIII, and IX.

*Example 1.—Isomerization of Compound VII*

1 g. of Compound VII $$E_{1\,cm.}^{1\%}\ (289\ m\mu) = 700\ (80\%\ \text{pure})$$

was dissolved in 15 cc. of benzene containing 4 mg. of $I_2$ and refluxed for 15 min. The mixture was worked up after cooling by passing the solution through a column of sodium sulfate and sodium aluminum silicate. The product analyzed for 35% Compound VIII by infra red spectrum and had $$E_{1\,cm.}^{1\%}\ (348\ m\mu) = 1045$$

*Example 2.—Isomerization of Compound IX*

Compound IX which is separated in Example 1 by chromatography is isomerized to a mixture of Compounds VIII and IX in the following manner:

0.4 g. of Compound IX ester, $$E_{1\,cm.}^{1\%}\ (348\ m\mu) = 1500$$

was dissolved in 5 cc. of benzene containing 0.025 cc. of phosphorous oxychloride and refluxed 25 minutes. The reaction was worked up by washing with water, drying and evaporation of solvent. The product assayed for 35% Compound VIII by infra red analysis and had $$E_{1\,cm.}^{1\%}\ (348\ m\mu) = 1054$$

Compound IX may be more easily isomerized if Compound VII is present in about the ratio of 40:60 Compound VII to Compound IX.

The examples previously given illustrate the production of straight-chain-conjugated polyene esters in improved yield. Any of the esters may be converted to the corresponding straight-chain-conjugated polyene acids by the standard methods, such as alkali saponification or acid hydrolysis.

Compound VIII is vitamin A acid ester. It has about 10% of the vitamin A activity of an equivalent amount of natural vitamin A. It may be saponified to yield vitamin A acid or it may be reacted with lithium aluminum hydride ($LiAlH_4$) to give vitamin A alcohol.

The synthesis of vitamin A in improved yield by using our invention is illustrated in the following example:

*Example 3.—Preparation of vitamin A from β-ionone (Compound I)*

*Preparation of the ethyl ester of β-ionolacetic acid (Compound III).*—96 g. (0.5 mole) β-ionone, 96 g. (0.575 mole) ethyl bromoacetate, 37.6 g. (0.575 atom) zinc dust, 250 ml. benzene, and a crystal of iodine were heated to refluxing until a reaction commenced. When the spontaneous evolution of heat had ceased the mixture was refluxed 30 min., cooled, shaken with excess 5% hydrochloric acid, and the benzene layer washed successively with water and dilute sodium bicarbonate solution. After drying over sodium sulfate, the benzene was evaporated, and the residue of crude Compound III distilled in a cyclic molecular still to give a purer Compound III as a pale yellow, viscous oil, $$E_{1\,cm.}^{1\%}\ (231\ m\mu) = 200\ (\text{in ethanol})$$

Another preparation had $$E_{1\,cm.}^{1\%}\ (234\ m\mu) = 205$$

*Preparation of the ethyl ester of β-ionylidene acetic acid (Compound IV).*—Compound III (14.8 g.) was dissolved in benzene (106 cc.), 0.5 cc. of $POCl_3$ dissolved in 42 cc. benzene was added, and the mixture refluxed for one hour. The benzene solution was cooled, passed through 15 g. of sodium aluminum silicate, and washed through with additional benzene (100 cc.). After removal of the solvent in vacuo, the residue was dissolved in 100 cc. of petroleum ether and passed through a column 2 inches in diameter and packed for a length of 20 inches with finely divided sodium aluminum silicate. The column was then washed with 1.8 liters of petroleum ether. The petroleum ether was evaporated from the material which had passed through the column leaving 8 grams of purified ethyl ester of β-ionylidene acetic acid.

The column was eluted with 1.3 liters of acetone to remove the isomeric Compound V from the adsorbent. The acetone was evaporated from the solution to leave 6.5 grams of Compound V. This was dissolved in 35 cc. of benzene and 0.21 cc. $POCl_3$ in 30 cc. benzene was added. The mixture was refluxed for six hours after which it was cooled, washed repeatedly with water, then dried by addition of sodium sulfate, filtered, and the solvent evaporated.

The residue, which consisted of 6.4 grams of a mixture of Compounds IV and V, was dissolved in 50 cc. of petroleum ether and passed through an adsorption column as before. After washing with about 600 cc. of petroleum ether, the solvent was evaporated from the material which had passed through the column to yield 3 grams of Compound IV.

The column was eluted with acetone and the acetone evaporated to leave 3.3 grams of Compound V. This compound was reserved for addition to some Compound V from a fresh batch before further isomerization was attempted.

It will be observed that from 14.8 grams of the ethyl ester of β-ionolacetic acid 11 grams of substantially pure compound IV was prepared and sufficient material was left for further isomerization to yield an additional gram of Compound IV. This represents approximately an 80% yield of Compound IV. All of the Compound V produced is available for isomerization. The only losses in yield are caused by decomposition during refluxing, destruction on the adsorption column, mechanical losses, and a slight quantity of side product produced during the processing operations.

Separation of Compounds IV and V may also be effected by fractional distillation under vacuum or by solvent extraction. In either case the isomer of Compound IV is available for further isomerization in accordance with the method explained above.

*Preparation of β-ionylidene ethanol.*—4.6 g.

(.0175 mole) of Compound IV was dissolved in 60 ml. of dry ether, and 50 ml. of a 0.4 N ethereal solution of lithium aluminum hydride (LiAlH4) was added over a period of 2 min. After stirring 5 additional minutes, 100 ml. of 5% hydrochloric acid was added, and the ether layer washed with water, dried by the addition of 10 g. of sodium sulfate, and the solvent evaporated, to give 4.0 g. of product, $E_{1\,cm.}^{1\%}$ (265 m$\mu$) = 534 (in ethanol)

*Preparation of Compound VI.*—3.0 grams of $\beta$-ionylidene ethanol prepared as above were refluxed 20 hrs. with 40 ml. of acetone, 60 ml. of benzene, and 6.0 g. of aluminum isopropoxide. The mixture was cooled, poured into 150 ml. of 5% HCl, washed successively with 5% HCl, sodium bicarbonate, and water. The ether was dried and evaporated to give Compound VI admixed with unreacted $\beta$-ionylidene ethanol and other impurities. It was purified by chromatographing on finely divided sodium aluminum silicate from petroleum ether solution, and had $E_{1\,cm.}^{1\%}$ (345 m$\mu$) = 990

The semi-carbazone melted at 188–189°, and had $E_{1\,cm.}^{1\%}$ (344 m$\mu$) = 1630

*Preparation of the ethyl ester of $\alpha$-hydro-$\beta$-hydroxy vitamin A acid (Compound VII).*—3.1 g. of Compound VI, 4.2 g. of ethyl bromoacetate, 1.5 g. of zinc dust, 15 ml. of benzene, and 5 ml. of ethyl ether were heated to reflux until a reaction commenced. When the spontaneous evolution of heat ceased the mixture was refluxed 30 minutes, cooled, shaken with excess 5% hydrochloric acid, and the benzene layer washed successively with water and dilute potassium hydroxide solution. The mixture was dried over sodium sulfate and filtered. The benzene was evaporated under vacuum yielding a residue consisting of Compound VII. This ester had $E_{1\,cm.}^{1\%}$ (290 m$\mu$) = 730

Another preparation had $E_{1\,cm.}^{1\%}$ (290 m$\mu$) = 801

*Preparation of the ethyl ester of vitamin A acid (Compound VIII).*—To 3.8 g. of Compound VII dissolved in 3.4 cc. of benzene, was added 0.21 cc. of a solution of POCl3 in 38 cc. of benzene. The mixture was allowed to stand at room temperature for 4 hours. The benzene solution was then passed through a column containing 10 g. of sodium aluminum silicate and washed through with an additional 30 ml. of benzene.

Evaporation of the solvent under vacuum yielded a residue (3.3 g.) consisting of a mixture of Compounds VIII and its isomer IX. This mixture which had $E_{1\,cm.}^{1\%}$ (348 m$\mu$) = 1130 was dissolved in petroleum ether (35 cc.) and chromatographed through a column of sodium aluminum silicate (135 g.). The column was washed with 600 cc. of petroleum ether. The petroleum ether was then evaporated from the material which had run through the column leaving as a residue 1.2 grams of the ethyl ester of vitamin A acid. The material had $E_{1\,cm.}^{1\%}$ (355 m$\mu$) = 1010

Another preparation had $E_{1\,cm.}^{1\%}$ (350 m$\mu$) = 1080

The column was then eluted with 600 cc. of benzene-petroleum ether mixture (80:20) to remove Compound IX plus a small amount of Compound VIII which had been held on the adsorbent. The benzene-petroleum ether mixture was evaporated under vacuum to 1.6 grams of Compound IX, the isomer of Compound VIII. This Compound IX was then mixed with .053 cc. of oxalyl chloride in 16 cc. of benzene and allowed to stand in the dark for 8 hours at room temperature. The solution was then passed through another column of sodium aluminum silicate (5–10 g.), washed through with additional solvent, and evaporated under vacuum to leave a residue consisting of Compounds VIII and IX. This residue was dissolved in 15 cc. of petroleum ether and separated by chromatographing as described above, yielding an additional 0.5 g. of Compound VIII. The Compound IX plus a small amount of Compound VIII which was retained on the column was eluted with benzene-petroleum ether as described above, the solvent evaporated, and the residue, which consisted of 1 g., was ready to be run through an isomerization treatment again.

As was the case with separation of Compounds IV and V, distillation under vacuum and solvent extraction could have been used to effect separation of Compounds VIII and IX and Compound IX could have been subjected to another isomerization.

The various catalysts specified in the above isomerizations are not the only ones which could have been used. Other catalysts of the type described in this specification would have been satisfactory. Of these catalysts phosphorus oxychloride and oxalyl chloride are satisfactory for use at room temperature or even lower.

*Preparation of vitamin A alcohol.*—0.75 g. of Compound VIII was dissolved in 10 ml. of dry ether and 10 ml. of a 0.68 N ethereal solution of lithium aluminum hydride was added over a period of 2 minutes. The solution was agitated for five additional minutes after which 15 ml. of 5% acetic acid was slowly added, the ether layer was washed with water, 5% sodium carbonate solution, and again with water to neutrality. After drying of the ether solution over sodium sulfate, and filtering, the solvent was evaporated to give 0.64 g. of vitamin A alcohol. This may be esterified in order to convert it to a more stable form.

While our invention has been described in considerable detail in the above description and examples it will be understood that many modifications and variations therein may be made without departing from the spirit and scope of the invention as it is defined by the appended claims.

What we claim is:

1. The process of preparing in good yield an $\alpha,\beta$-unsaturated polyene compound having the formula

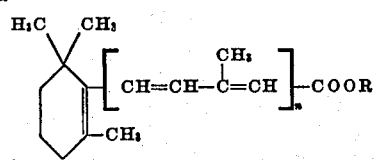

wherein $n$ is a whole integer not less than 1 and not greater than two and R is a member of the class consisting of hydrogen and hydrocarbon radicals which comprises substantially completely dehydrating an $\alpha$-hydro-$\beta$-hydroxy hydrate of said $\alpha,\beta$-unsaturated polyene compound and thereby forming a mixture of said $\alpha,\beta$-unsaturated polyene compound and a structural isomer thereof, separating said α,β-unsaturated polyene compound from said structural isomer, and converting a substantial portion of said structural isomer to said α,β-unsaturated polyene compound by treating said structural isomer with an ionizing proton attractor selected from the group consisting of acidic materials and iodine.

2. The process of preparing in good yield an α,β-unsaturated polyene compound having the formula

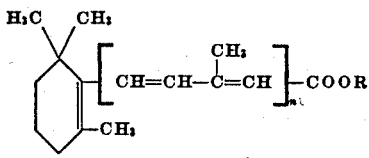

wherein n is a whole integer not less than 1 and not greater than two and R is a member of the class consisting of hydrogen and hydrocarbon radicals which comprises substantially completely dehydrating an α-hydro-β-hydroxy hydrate of said α,β-unsaturated polyene compound and thereby forming a mixture of said α,β-unsaturated polyene compound and a structural isomer thereof, converting a substantial amount of said structural isomer present in said dehydrated mixture to said α,β-unsaturated polyene compound by treating said dehydrated mixture with an ionizing proton attractor selected from the group consisting of acidic materials and iodine, separating said α,β-unsaturated polyene compound from said structural isomer, and converting a substantial portion of said structural isomer to said α,β-unsaturated polyene compound by treating said structural isomer with an ionizing proton attractor selected from the group consisting of acidic materials and iodine.

3. The process of preparing vitamin A acid ester which comprises dehydrating α-hydro-β-hydroxy vitamin A acid ester and thereby forming a mixture of vitamin A acid ester and a structural isomer thereof, separating said vitamin A acid ester from said structural isomer, and isomerizing said structural isomer by treating said isomer with iodine and thereby converting a substantial portion of said structural isomer to said vitamin A acid ester.

4. The process of preparing β-ionylidene acetic acid ester which comprises dehydrating an ester of β-ionolacetic acid and thereby forming a mixture of β-ionylidene acetic acid ester and a structural isomer thereof, separating said β-ionylidene acetic acid ester from said structural isomer, and isomerizing said structural isomer by treating said isomer with iodine and thereby converting a substantial portion of said structural isomer to said β-ionylidene acetic acid ester.

5. The process of preparing in good yield an α,β-unsaturated polyene compound having a conjugated double bond system and having the formula

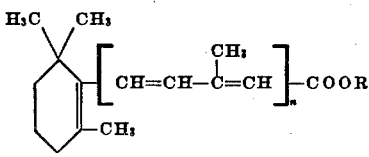

wherein n is a whole integer not less than 1 and not greater than 2 and R is a member selected from the class consisting of hydrogen and hydrocarbon radicals which comprises dehydrating an α-hydro-β-hydroxy hydrate of said α,β-unsaturated polyene compound by dissolving said hydrate in an organic solvent and treating said hydrate with an acidic dehydration catalyst, continuing said treating substantially longer than necessary to effect substantially complete dehydration and thereby forming a mixture of said α,β-unsaturated polyene compound and a structural isomer thereof, separating said α,β-unsaturated compound from said structural isomer, and isomerizing said structural isomer by treating said isomer in solution in an organic solvent with an acidic material and thereby converting a substantial portion of said structural isomer to said α,β-unsaturated polyene compound.

6. The process of preparing in good yield an α,β-unsaturated polyene compound having the formula

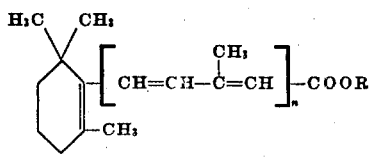

wherein n is a whole integer not less than 1 and not greater than 2 and R is a member selected from the class consisting of hydrogen and hydrocarbon radicals which comprises refluxing a mixture of an acidic dehydration catalyst and an organic solvent solution of an α-hydro-β-hydroxy hydrate of said α,β-unsaturated polyene compound and thereby forming a mixture of said α,β-unsaturated compound and a structural isomer thereof, said refluxing being continued substantially beyond the time necessary to effect substantially complete dehydration until said mixture contains substantially equilibrium proportions of said α,β-unsaturated polyene compound and said structural isomer, separating said α,β-unsaturated polyene compound from said structural isomer, and isomerizing said structural isomer by refluxing an organic solvent solution of said isomer containing an acidic material and thereby converting a substantial portion of said structural isomer to said α,β-unsaturated polyene compound.

7. The process of preparing in good yield an α,β-unsaturated polyene compound having the formula

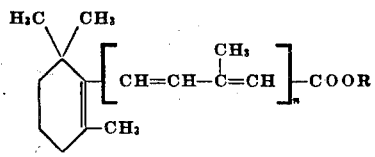

wherein n is a whole integer not less than 1 and not greater than 2 and R is a member selected from the class consisting of hydrogen and hydrocarbon radicals which comprises heating a mixture of an α-hydro-β-hydroxy hydrate of said α,β-unsaturated compound and an acidic material for a time substantially longer than necessary for dehydration alone and thereby forming a mixture of said α,β-unsaturated compound and a structural isomer thereof, separating said α,β-unsaturated polyene compound from said structural isomer, and isomerizing said structural isomer by heating a mixture of said structural isomer and an acidic material for a time sufficient to convert a substantial portion of said isomer to said α,β-unsaturated polyene compound, said separating and isomerizing being repeated until a major proportion of said α-hydro-β-hydroxy hydrate is converted to said α,β-unsaturated polyene compound.

8. The process of preparing in good yield an α,β-unsaturated polyene compound having the formula

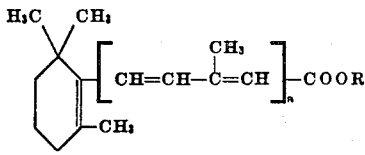

wherein $n$ is a whole integer not less than 1 and not greater than 2 and R is a member of the class consisting of hydrogen and hydrocarbon radicals which comprises treating an α-hydro-β-hydroxy hydrate of said α,β-unsaturated polyene compound with an acidic material, continuing said treating with said acidic material beyond the time necessary to effect substantially complete dehydration of said hydrate and thereby forming a mixture of said α,β-unsaturated polyene compound and a structural isomer thereof, said mixture containing an amount of said α,β-unsaturated polyene compound substantially in excess of the amount present at the time substantially complete dehydration is effected, and separating said α,β-unsaturated polyene compound from said structural isomer thereof.

9. The process of preparing in good yield an α,β-unsaturated polyene compound having the formula

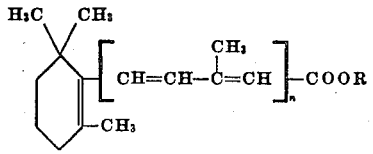

wherein $n$ is a whole integer not less than 1 and not greater than 2 and R is a member of the class consisting of hydrogen and hydrocarbon radicals which comprises treating an α-hydro-β-hydroxy hydrate of said α,β-unsaturated polyene compound with an acidic material, continuing said treating substantially beyond the time necessary to effect substantially complete dehydration of said hydrate and thereby forming a mixture of said α,β-unsaturated polyene compound and a structural isomer thereof, separating said structural isomer from said α,β-unsaturated polyene compound, mixing the separated structural isomer with an additional amount of said α-hydro-β-hydroxy hydrate, treating the resulting mixture with an acidic material and thereby isomerizing a substantial portion of said separated structural isomer to said α,β-unsaturated polyene compound, said treating also converting said hydrate to a mixture of said α,β-unsaturated polyene compound and said structural isomer thereof.

10. The process of preparing in good yield an α,β-unsaturated polyene compound having the formula

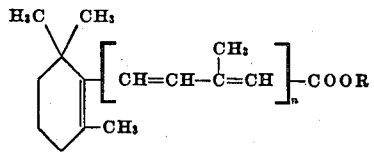

wherein $n$ is a whole integer not less than 1 and not greater than 2 and R is a member of the class consisting of hydrogen and hydrocarbon radicals which comprises dehydrating an α-hydro-β-hydroxy hydrate of said α,β-unsaturated polyene compound to form a mixture of said α,β-unsaturated polyene compound and a structural isomer thereof, converting a substantial portion of said structural isomer in said mixture to said α,β-unsaturated polyene compound by isomerizing said structural isomer, said isomerizing being effected by treating said mixture with an acidic material for a substantial time following substantial completion of dehydration of said hydrate, separating said α,β-unsaturated polyene compound from said structural isomer, and converting an additional portion of said structural isomer to said α,β-unsaturated polyene compound by subjecting the separated structural isomer to isomerization effected by treating said isomer with an acidic material, said separating and isomerizing being repeated to effect conversion of a major amount of said α-hydro-β-hydroxy hydrate to said α,β-unsaturated polyene compound.

11. The process of preparing in good yield an α,β-unsaturated polyene compound having the formula

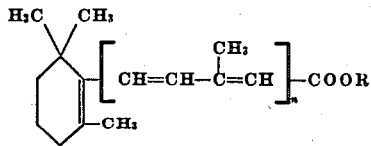

wherein $n$ is a whole integer not less than 1 and not greater than 2 and R is a member of the class consisting of hydrogen and hydrocarbon radicals which comprises refluxing a mixture of an acidic material and an organic solvent solution of an α-hydro-β-hydroxy hydrate of said α,β-unsaturated polyene compound and continuing said refluxing substantially longer than necessary to effect substantially complete dehydration of said hydrate, said refluxing being effective to form a mixture comprising said α,β-unsaturated polyene compound and a structural isomer thereof, separating said α,β-unsaturated polyene compound from said structural isomer by means of solvent extraction, and isomerizing said structural isomer by refluxing a solution of said isomer with an acidic material and thereby converting a substantial portion of said structural isomer to said α,β-unsaturated polyene compound.

12. The process of preparing an intermediate in the manufacture of synthetic vitamin A which comprises dehydrating an ester of β-ionolacetic acid and thereby forming a mixture of β-ionylidene acetic acid ester and a structural isomer thereof, separating said β-ionylidene acetic acid ester from said structural isomer, and isomerizing said structural isomer by treating said isomer with an acidic material and thereby converting a substantial portion of said isomer to said β-ionylidene acetic acid ester.

13. The process of preparing β-ionylidene acetic acid ester in good yield which comprises treating an ester of β-ionolacetic acid with an acidic material and thereby forming a mixture of β-ionylidene acetic acid ester and a structural isomer thereof, said treating being continued substantially longer than necessary to effect substantially complete dehydration and until said mixture contains substantially equilibrium proportions of said β-ionylidene acetic acid ester and said structural isomer, separating said β-ionylidene acetic acid ester from said structural isomer, and isomerizing said structural isomer by treating said isomer with an acidic material and thereby converting a substantial portion of said structural isomer to said β-ionylidene acetic acid ester.

14. The process of preparing β-ionylidene acetic acid ester which comprises heating a mixture comprising an ester of β-ionolacetic acid and an acidic material and thereby forming a mixture of β-ionylidene acetic acid ester and a structural isomer thereof, said heating being continued substantially longer than necessary to effect substantially complete dehydration, separating said β-ionylidene acetic acid ester from said structural isomer, and isomerizing said separated structural isomer and thereby forming a new mixture of β-ionylidene acetic acid ester and said structural isomer by treating said separated structural isomer additionally with an acidic material, said separating and isomerizing being repeated until a major amount of said β-ionolacetic acid ester is converted to said β-ionylidene acetic acid ester.

15. The process of preparing vitamin A acid ester which comprises dehydrating α-hydro-β-hydroxy vitamin A acid ester and thereby forming a mixture of vitamin A acid ester and a structural isomer thereof, separating said vitamin A acid ester from said structural isomer, and isomerizing said structural isomer by treating said isomer with an acidic material and thereby converting a substantial portion of said structural isomer to said vitamin A acid ester.

16. The process of preparing vitamin A acid ester which comprises heating a mixture comprising an α-hydro-β-hydroxy vitamin A acid ester and an acidic material and thereby producing a mixture of vitamin A acid ester and a structural isomer thereof, said heating being continued substantially longer than necessary to effect substantially complete dehydration and until said mixture contains substantially equilibrium proportions of said vitamin A acid ester and said structural isomer, separating said vitamin A acid ester from said structural isomer, and isomerizing said separated structural isomer by heating said separated structural isomer with an acidic material and thereby converting a substantial portion of said structural isomer to said vitamin A acid ester.

17. The process of preparing vitamin A acid ester in good yield which comprises heating a mixture comprising an acidic material and an organic solvent solution of an α-hydro-β-hydroxy vitamin A acid ester and thereby forming a mixture of vitamin A acid ester and a structural isomer thereof, said heating being continued substantially longer than necessary to effect substantially complete dehydration, separating said vitamin A acid ester from said structural isomer, and isomerizing said separated structural isomer and thereby forming a further mixture of said vitamin A acid ester and said structural isomer by heating an organic solvent solution of said separated structural isomer additionally with an acidic material, said separating and isomerizing being repeated until a major amount of said α-hydro-β-hydroxy vitamin A acid ester is converted to said vitamin A acid ester.

18. The method of producing vitamin A in increased yield which comprises converting β-ionone to β-ionolacetic acid ester, dehydrating said β-ionolacetic acid ester and thereby forming a mixture of β-ionylidene acetic acid ester and a structural isomer thereof, separating said β-ionylidene acetic acid ester from said structural isomer, isomerizing said structural isomer by treating an organic solvent solution of said structural isomer with an acidic material for a substantial time and thereby forming an additional amount of said β-ionylidene acetic acid ester, reducing said β-ionylidene acetic acid ester to β-ionylidene ethanol, oxidizing said β-ionylidene ethanol to a ketone of the formula

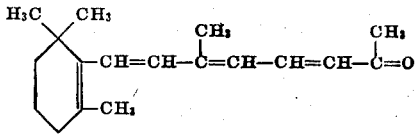

converting said ketone to α-hydro-β-hydroxy vitamin A acid ester, dehydrating said α-hydro-β-hydroxy vitamin A acid ester and thereby forming a mixture of vitamin A acid ester and a structural isomer thereof, separating said vitamin A acid ester from the last said structural isomer, isomerizing the last said structural isomer following said separating by treating an organic solvent solution of the last said structural isomer with an acidic material for a substantial time and thereby forming an additional amount of said vitamin A acid ester, and reducing said vitamin A acid ester to vitamin A.

19. The process of preparing vitamin A in improved yield which comprises converting β-ionone to β-ionolacetic acid ester, treating said β-ionolacetic acid ester with an acidic material and thereby producing a mixture of β-ionylidene acetic acid ester and a structural isomer thereof, said treating being continued until said mixture comprises substantially equilibrium proportions of said β-ionylidene acetic acid ester and said structural isomer thereof, separating said structural isomer from said β-ionylidene acetic acid ester, isomerizing said separated structural isomer by treating said isomer additionally with an acidic material and thereby converting a substantial portion of said structural isomer to said β-ionylidene acetic acid ester, said separating and isomerizing being repeated until a major proportion of said β-ionolacetic acid ester is converted to said β-ionylidene acetic acid ester, reducing said β-ionylidene acetic acid ester to β-ionylidene ethanol, oxidizing said β-ionylidene ethanol to a ketone of the formula

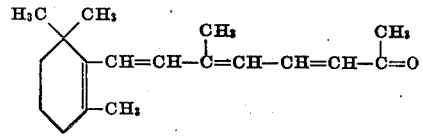

converting said ketone to α-hydro-β-hydroxy vitamin A acid ester, dehydrating said α-hydro-β-hydroxy vitamin A acid ester by treating said α-hydro-β-hydroxy vitamin A acid ester with an acidic material and thereby producing a mixture comprising vitamin A acid ester and a structural isomer of said vitamin A acid ester, said treating with said acidic material being continued until the last said mixture comprises substantially equilibrium proportions of said vitamin A acid ester and said structural isomer of said vitamin A acid ester, separating said last-named structural isomer from said vitamin A acid ester, isomerizing said separated structural isomer of said vitamin A acid ester by treating it additionally with an acidic material and thereby converting a substantial portion of said structural isomer of vitamin A acid ester to said vitamin A acid ester, said separating and isomerizing being repeated until a major proportion of said α-hydro-β-hydroxy vitamin A acid ester is converted to said vitamin A acid ester, and reducing said vitamin A acid ester to vitamin A.

EDGAR M. SHANTZ.
CHARLES D. ROBESON.
HENRY M. KASCHER.

REFERENCES CITED

The following references are of record in the file of this patent:

UNITED STATES PATENTS

| Number | Name | Date |
|---|---|---|
| 2,424,994 | Milas | Aug. 5, 1947 |

OTHER REFERENCES

Karrer et al., Helv. Chim. Acta, vol. 29, 704–11 (1946).

Young et al., Jour. Am. Chem. Soc., vol. 69, 2042–6 (1947).

Van Dorp et al., Rec. Trav. Chim., vol. 65, 338–5 (1946).

Isler et al., Experimentia, vol. 2, page 31 (1946).

Milas et al., Jour. Am. Chem. Soc., vol. 69, 2247–8 (1947), rec'd August 26, 1947.